United States Patent [19]

Kryger

[11] Patent Number: 5,017,057
[45] Date of Patent: May 21, 1991

[54] APPARATUS FOR DRILLING A CIRCULARLY CURVED BORE

[75] Inventor: Tom F. Kryger, Stanhope, N.J.

[73] Assignee: Ronald J. Harms, Phillipsburg, N.J.; a part interest

[21] Appl. No.: 403,565

[22] Filed: Sep. 5, 1989

[51] Int. Cl.⁵ .................... B23B 41/00; B23B 45/14
[52] U.S. Cl. ...................................... 408/68; 408/127
[58] Field of Search ............... 408/127, 68, 108, 109; 144/103, 104, 106; 409/179; 29/558

[56] References Cited

U.S. PATENT DOCUMENTS

| | | | |
|---|---|---|---|
| 195,181 | 9/1877 | Strohm | 408/127 X |
| 550,783 | 12/1895 | Elliott et al. | 408/124 X |
| 1,517,309 | 12/1924 | Morgan | 269/165 |
| 2,958,349 | 11/1960 | McNutt | 408/127 X |
| 2,960,892 | 11/1960 | Spravka | 408/127 |
| 3,617,143 | 11/1971 | McKee | 408/127 |

FOREIGN PATENT DOCUMENTS 180030 5/1922 United Kingdom ................ 144/103

Primary Examiner—Z. R. Bilinsky
Attorney, Agent, or Firm—Steele, Gould & Fried

[57] ABSTRACT

An apparatus for drilling a circularly curved hole in a workpiece, following a curved path around an arc includes a support, shaped to rest against the workpiece, a chassis mounted to the support on a pivot axis defining a center of the curved path, and a drilling bit. The drilling bit is disposed on the distal end of a shaft which is likewise curved around the path, and is provided with a power transmission section connected to the drilling bit and disposed along the arc, coaxial with the pivot axis of the chassis. An electric motor or electric hand drill with chuck is used to apply power to the power transmission section, while manually forcing the chassis around the pivot axis, thereby moving the drilling bit along the path. The support can be adjustable to span and/or clamp on the workpiece. The power transmission section can include an internal or external member carrying power along a fixed tube or shaft respectively. The angle around the axis from the drilling bit to the chassis is about 100–105 degrees, allowing extra space for the bit to clear the workpiece at the emerging end of the path.

17 Claims, 2 Drawing Sheets

U.S. Patent    May 21, 1991    Sheet 1 of 2    5,017,057
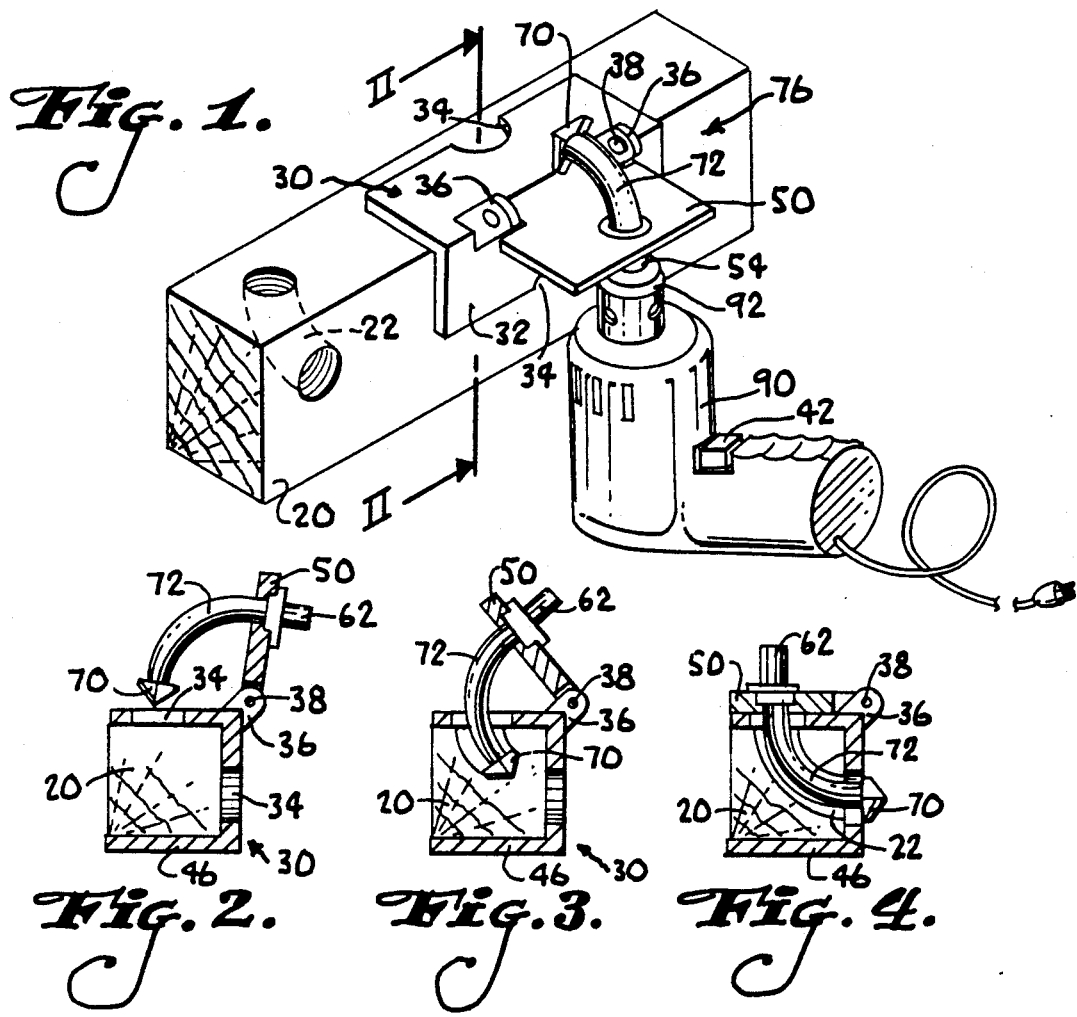
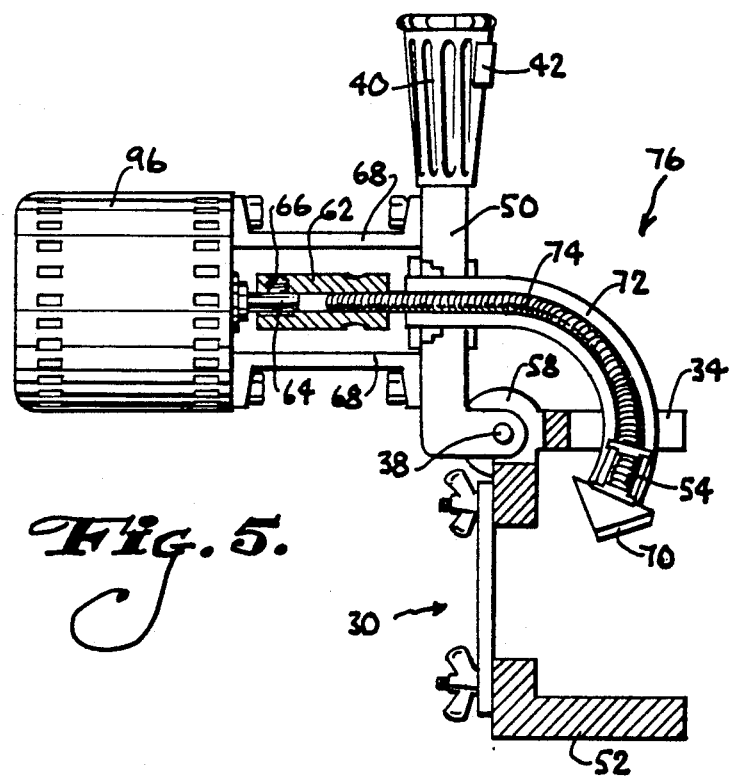

APPARATUS FOR DRILLING A CIRCULARLY CURVED BORE

BACKGROUND OF THE INVENTION

1. Field of the Invention

This invention relates to the field of drilling apparatus and hand tools, and especially to a device for forming a bore that follows a curve of predetermined radius around a right angle, through a workpiece such as a wooden building stud.

2. Description of the Prior Art

It is normally and routinely necessary when boring a hole in a workpiece to do the boring with a straight and balanced rotating cutting bit. If the bit is unbalanced, or not straight, the eccentric weight tends to whip the drill bit around, stressing the shaft and eventually bending or breaking the bit, the shaft driving the bit such that the bit whirls around uselessly. It is, of course, not possible to drill a curved hole with a straight and rigid bit.

U.S. Pat. No. 3,709,624—Blank discloses a machine for accurately machining curved holes. The device comprises a rotating table upon which a workpiece is set, and a series of gears driving a bit against which the workpiece is advanced. The gears are disposed alternately at right angles to one another for carrying the power from a driven end to the bit end of a curved power-transmitting means. The Blank device is a heavy-duty apparatus, not suitable for use as a hand tool, and is complex due to the plural gears.

U.S. Pat. No. 3,617,143—McKee discloses a device quite similar to that of Blank. In McKee, a workpiece holding table is provided with means for holding a shaft which has been bent around a curved path. A drilling bit mounted on a curved drive means is then applied to bore out the middle of the shaft to form a pipe. This is considered more accurate by McKee than the more traditional method of bending a pipe around a curved surface, which often is characterized by an internal diameter restriction at the bend.

McKee and Blank disclose specialized heavy duty machine tools that are not suitable as general purpose hand tools.

It is often necessary, particularly in running domestic power wires through studs and other framing elements of a construction project, to route wires around a particular path. When installing domestic power wiring, it is frequently necessary for users of straight drill bits to bore a plurality of holes, or to bore larger holes than would be necessary if it was somehow readily possible to drill a smooth hole around right angles. In addition, surface mounted devices, such as switch plates, light fixtures, and the like, are normally served by power lines that run parallel to the wall or ceiling panel in which the fixture is mounted, the power lines making a right angle adjacent the fixture. While it is possible, given sufficient space, to make a tight right angle turn in the power wire, which is moderately flexible, there is a danger of abrading the wire or breaking conductors therein, and abrupt right angle changes in the path of the wire are likely to make it difficult to fish the wire through wall and ceiling spaces.

U.S. Pat. No. 3,016,073—Broussard et al discloses a flexible drill means wherein it is possible to drill a hole for wire fishing and the like through a fire-stop section of a wall. According to this patent, straight sections and curved sections of a flexible tube are led to a drilling bit. The drilling bit, however, is entirely straight, and drills a straight hole, notwithstanding the flexible drive shaft which causes the bit to rotate.

There has been a need for an apparatus to conveniently and inexpensively drill holes around a curved path in a workpiece such as a framing element or a stud, without the need for a large, complex and expensive apparatus. According to the present invention, a flexible drive shaft tracing around slightly more than 90 degrees terminates in a movable drill bit, rotatably supported at the distal end of a right angle bend of shaft or tubing. The shaft or tubing is carried on a chassis which positions the shaft or tubing precisely along the circumference of a circle around an axis of rotation between the chassis and a workpiece-engaging support. As the chassis is advanced around the workpiece, while rotating the drill bit, a curved hole is formed, the curved path being long enough (somewhat over 90 degrees), to allow room for the drill bit to emerge fully from the workpiece.

SUMMARY OF THE DISCLOSURE

It is an object of this invention to provide a convenient and inexpensive hand tool apparatus to drill holes around a circular arc.

It is also an object of the invention to provide a drill bit mounted on an end of a circularly-curved apparatus, and a flexible drive means in the apparatus for turning the bit, the bit being slightly larger than the curved means driving the bit.

It is another object of the invention to facilitate the fishing of wires in framing elements by providing a device to form smooth curved holes.

These and other objects are accomplished by an apparatus for drilling a hole in a workpiece following a curved path around an arc which includes a support, shaped to rest securely against the workpiece, a chassis mounted to the support on a pivot axis defining a center of the curved path, and a drilling bit. The drilling bit is disposed on the distal end of a shaft which is likewise curved to follow the path, and is provided with a power transmission section connected to the drilling bit and disposed along the arc, the arc being coaxial with the pivot axis of the chassis. A motor, or a hand drill with a chuck, is used to apply power to the power transmission section, to turn the bit while the apparatus pushes the chassis around the pivot axis, thereby moving the drilling bit along the path. The support can be adjustable. The power transmission section can include an internal or external member carrying power along a fixed tube or shaft respectively. The angle around the axis from the drilling bit to the chassis is about 100–105 degrees, allowing extra space for the bit to clear the workpiece at the emerging end of the path.

BRIEF DESCRIPTION OF THE DRAWING(S)

There are shown in the drawings the embodiments that are presently preferred. It should be understood, however, that the invention is not limited to the precise arrangements and instrumentalities shown in the drawings, wherein:

FIG. 1 is a perspective view of an apparatus according to the invention, shown applied to a workpiece.

FIGS. 2–4 are section views along line 2—2 in FIG. 1, illustrating the progressive advance of the drilling bit through the workpiece.

FIG. 5 is an elevation view of an alternative embodiment of the invention.

DETAILED DESCRIPTION OF THE PREFERRED EMBODIMENT(S)

Figures 6A, 6B, 7A, 7B:
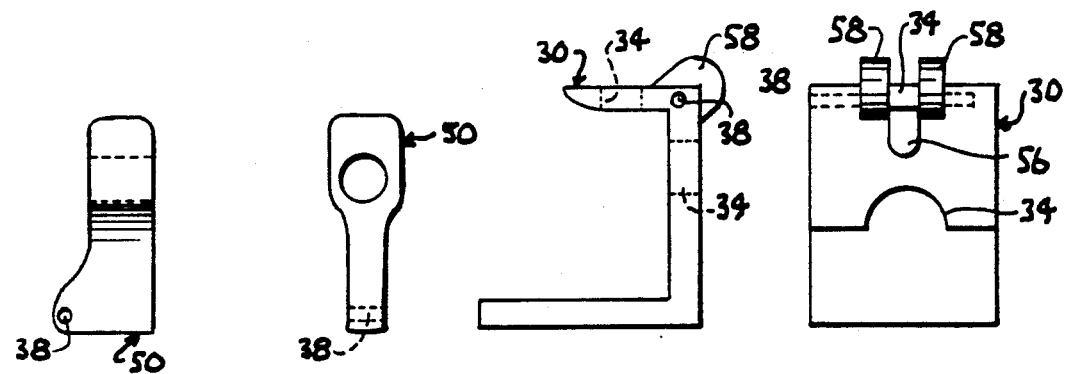
FIGS. 6A and 6B are a side view and an end elevation view, respectively, of a chassis element according to the invention.
FIGS. 7A and 7B are an end view and top plan view, respectively, of a support according to another embodiment of the invention, to be rested against a workpiece.

As shown in FIG. 1, a curved hole 22 is to be formed in a workpiece 20. The curved hole is a toroidal hole having a circular cross-section, proceeding around an arc of a circle. In order to drill a curved hole, a support 30 is disposed against a corner of the workpiece 20. The support 30 and workpiece 20 can both be substantially rectilinear, whereby the curved hole 22 enters and emerges from the workpiece aligned normal to the respective surfaces thereof. A movable chassis 50 is pivotably connected to support 30 at axis 38. As drill motor 90 and bit 70 are rotated counterclockwise with respect to FIG. 1, bit 70 engages workpiece 20 in the area of clearance cutout 34 and drills downwardly into workpiece 20 under pressure exerted by the user pushing the chassis 50 around the pivot axis at which chassis 50 and support 30 are connected.

Bit 70 is rotatably disposed on the end of tube 74. Tube 74 traces a circumference around axis 38, whereby upon rotating chassis 50 counterclockwise, the tube or shaft portion 74 follows along behind the bit 70. Bit 70 is larger than tube or shaft 74, whereby the tube or shaft 74 follows bit 70 without interference with the sides of the tube or the like.

On the opposite side of chassis 50 from bit 70, a motorized means such as electric drill 90 is connected to turn bit 70 through a flexible shaft connection. In the embodiment of FIG. 1, a flexible shaft resides between 70 and fixed collar 54, the collar being attached directly to chassis 50 and a flexible drive shaft being disposed within a rigid curved tube. It is also possible, as set forth more fully herein after, to employ a flexible tube and a rigid shaft for driving and supporting the bit.

Bit 70 can be arranged to make it easy to fish electrical wires around 90 degrees through framing elements. For this application, a three-quarter inch hole (1.9 cm) is appropriate, to accomodate household-rated Romex type cable. In that application, the apparatus of the invention assists in routing electrical power lines through rafters, vertical studs, fire block elements, and for surface mounting of electrical fixtures.

Support element 30 is a section of angle iron, having a pair of rearwardly-protruding ears 36, defining together with chassis 50 a hinge at axis 38. Support 30 preferably extends a substantial distance around the corner of the workpiece for good support. Inasmuch as the drill bit 70 in the disclosed embodiment is arranged somewhat closer to the axis 38 than the far edge of support 30, clearance cutouts 34 are provided to allow free passage of bit 70 on both the immersing and emerging ends of the curved path 22 to be formed.

The power transmission means for carrying power from the drill 90 or other motor means to bit 70 is subject to some variation. In the embodiment shown, a rigid curved tube is set in chassis 50, and the flexible drive shaft 74 resides therein. The flexible drive shaft is preferably a helically wound spring pitched such that the spring tends to tighten when rotated in the direction of rotation of the drill 90 or the like. The spring can have a flexible central portion, for example of stranded wire, embedded in an elastomeric filling in the lumen of the helical spring. Accordingly, when twisted in the cutting direction, the flexible drive shaft 74 transmits power to the bit.

Flexible drive shaft 74 is disposed in rigid tube 72. The rigid tube is, for example, in a device dimensioned for electrical wire paths through framing elements, 0.290 to 0.300 inches internal diameter tube (0.5 inch OD) and may be bent at a radius, for example of 1 and ¼ to 1 and ½ inches. The tube can be made by bending a piece of steel pipe, taking care not to allow the bend to collapse the internal diameter of the tube. The tube should be maintained round through bending to an accuracy of no more than 0.010 to 0.15 inches out of round. It may be stainless steel, or any carbon type steel.

Drill bit 70 should be a slightly larger diameter than the tube 72, at least one-third larger for ease of use, such that the tube does not bind on the sides of the curved hole as the work proceeds. Preferably, the bit 70 in this example defines a diameter of ⅝ to 11/16 inches. The bit can be of various configurations, including twist drill configurations, spade bits, augers and the like. Preferably, bit 70 is formed from plates aligned transversely to the axis of the bit 70, with leading edges designed to chisel out the material along the path. These plates can be welded onto a base fixed to the end of the flexible shaft 74.

FIGS. 2-4 illustrate the progress of the formation of the circular hole. In FIG. 2, the chassis and the power transmission section with drill bit 70 thereon, are advanced to the clearance hole 34 at the immersing end of the bore. FIG. 2 also illustrates a support 30 which is channel-shaped to better accommodate the workpiece. A channel-shaped support can be tightly attached by means of a set screw, wedges, or by means of supplemental fasteners such as nails or screws inserted through fixing holes (not shown) in support 30.

By the time the chassis portion 50 is aligned at right angles to the surface at the immersing end of the curved hole, drill bit 70 has already advanced into the workpiece to the point that the trailing edge of the bit is substantially aligned with the surface. This situation is shown in FIG. 3.

With further advance of the bit, as shown in FIG. 4, chassis element 50 eventually rests flat on support 30, parallel to the surface of the workpiece. Inasmuch as this is the maximum advance of the chassis, it is necessary that bit 70 protrude at the emerging end from the workpiece. Accordingly, the angle traced from the tip of bit 70 to the immersing end of the hole as shown in FIG. 4, must be greater than 90 degrees, preferably 100-105 degrees depending on the dimensions of the bit, ensuring complete emergence of the drilling bit and a finished curved bore 22.

FIG. 5 illustrates an alternative embodiment of the invention, having a dedicated motor rather than a chuck arrangement for attachment to an electric hand drill. In this embodiment, motor 96 is provided with a keyed shaft 64, attached to the flexible shaft 74 by means of a coupling 62 including a set screw 66 which bears against the keyed shaft 64 to rotationally fix the motor shaft to the proximal end of the flexible drive shaft 74. According to this embodiment, the chassis 50 is provided with means for receiving stand-off supports 68 attached to the motor 96, whereby the motor and chassis are rigidly attached. A protruding pistol grip handle 40, with an on/off and/or speed controlling switch control 42 is arranged at the end of the chassis, opposite the end pivotally attached to the support 30. Accordingly, the user can exert some leverage on the chassis at the end of the grip, easily forcing the rotating bit 70 to advance through the workpiece.

FIG. 5 illustrates that the connection between the bit 70 and the flexible drive shaft can be as simple as a compression of the collar at the base of bit 70 over the drive shaft material. As also shown in FIG. 5, the arrangement including a flexible shaft 74 is preferably arranged such that the flexible portion of the shaft does not reach clear to the distal end of the curved tube 72. Instead, at the distal end of tube 72, a cylindrical noncurving bore 78 is formed, aligned to the axis of bit 70 and arranged to support bit 70 rotationally in correct alignment and position. Bore 78 can be provided with a bushing, bearing or the like to maintain the position of bit 70 relative to the remainder of the device without undue friction. Inasmuch as bit 70 is securely and rotatably attached to the rigid tube 72, very little vibration or movement of the device can be expected during a drilling operation. All the flexing involved in transmitting power to the bit and in advancing the bit along the path, is taken up by flexible shaft 74.

FIG. 5 illustrates a support 30 comprising two adjustably-spaced angle parts. Butterfly nuts fix the spacing when set by sliding the angle parts toward one another on slotted holes (not shown).

FIG. 6A, 6B, 7A and 7B illustrate preferred arrangements for the support 30 and chassis 50, respectively. In FIG. 6A, chassis 50 is provided with a bore for receiving a pin defining axis 38 at an extreme corner of chassis 50, allowing additional clearance whereby the chassis 50 can come slightly past parallel to the workpiece when advancing toward the workpiece. In the area of hinge 38, chassis 50 is elongated in the insertion direction, while spaced from axis 38 at the point of attachment of tube 72, the chassis 50 is elongated in a direction transverse to the insertion direction. A set screw (not shown) can be provided to lock tube 72 in the bore provided.

FIGS. 7A and 7B illustrate a preferred arrangement for support 30. As shown in FIG. 7A, support 30 preferably is channel-shaped. Clearance holes 34 allow for passage of bit 70 as in the previous embodiment. The pivot axis 38 between the chassis 50 and the support 30 is disposed very close to the surface of the workpiece. Accordingly, to allow adequate clearance for chassis 50, a slot 56 is formed in the support to accommodate the chassis. This tends to weaken the chassis, particularly due to the closely spaced clearance hole 34, as shown in FIG. 7B. In order to improve the strength of the support adjacent the slot, supplemental buttresses 58 are provided.

Figure 8:
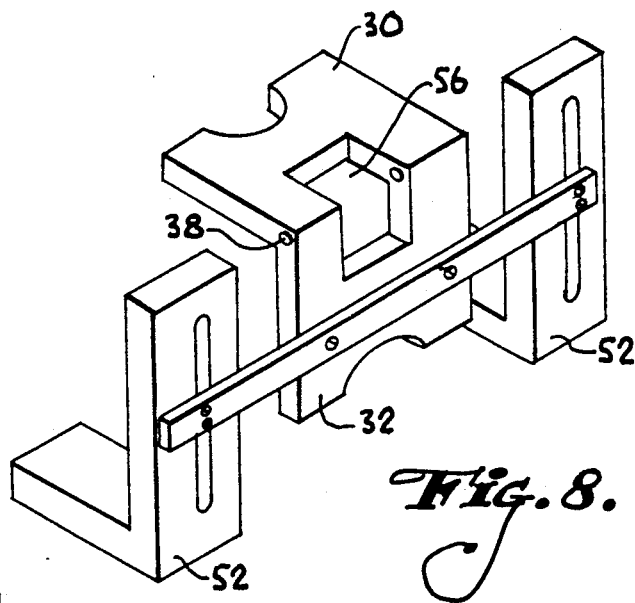
FIG. 8 is a perspective view of an alternative embodiment of a support, shown without the chassis element.

FIG. 8 illustrates an adjustable embodiment for support 30. In this arrangement, the fixed channel shape for support 30 shown in FIG. 7B is further provided with means for advancing the opposed flanges of the channel toward one another. A slidable arrangement between the opposed members can be provided and locked down by screws or the like when the device is in proper position. As described above, support 30 has a slot 56, for receiving chassis 50, and clearance 34 for bit 70. This arrangement is only one possibility for a clamping-type support, and it will be appreciated that various other configuration including C-clamps, set screws, threadably or resiliently clamped movable opposed members and the like can be employed.

Figure 9:
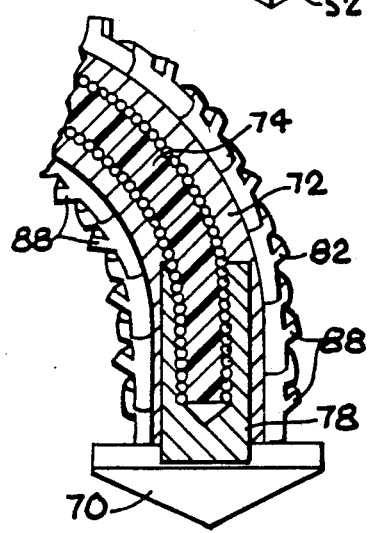
FIG. 9 is a detailed partial section view through a curved power transmission device according to the invention, showing the mounting of the drilling bit on a flexible internal drive shaft.

FIG. 9 illustrates the curved tube 72, flexible shaft 74 and bit 70 in detail. Tube 72 is shown along its bent portion between bit 70 and the leading edge of chassis 50. The remainder of tube 72 is preferably straight, and provided with a fitting for application of power to the flexible drive shaft 74. FIG. 9 also illustrates the cylindrical shaped fitting that terminates the flexible shaft and connects the flexible shaft to bit 70. As is apparent from FIG. 9, the cylindrical base of the bit and/or a bushing carrying the bit resides in a cylindrical bore 78 which effectively thins the wall of tube 72 on the inside of the arc, and protrudes into the wall on the outside of the arc. The axis of the cylindrical shaped fitting can be located close to the inside of the arc as shown in FIG. 9, to maximize strength. This arrangement allows the flexible drive shaft a maximum of clearance into the cylindrical fitting. In any event, the tube must be thick enough to stand the thinning due to the bore for the cylindrical fitting, under regular use.

Also shown in FIG. 9 is a chip-clearing external helical spring 82, having fins 88 for carrying chips rearward from the bore. The external tube is optional in this embodiment because bit 70 is turned by internal spring shaft 74. Shaft 74 has a helical spring embedded in elastomeric material and is welded or crimped onto the fitting for bit 70.

Figure 10:
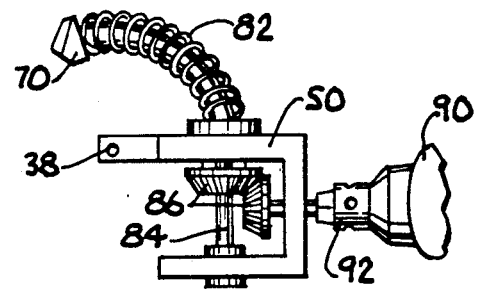
FIG. 10 is a partial section view of an alternative embodiment wherein the power transmission device has a flexible external tube, disposed on a rigid, curved shaft.

FIG. 10 illustrates an alternative embodiment of the invention comprising a rigid tube provided with an external spring 82 in lieu of or in addition to the internal flexible drive shaft. The external spring 82, which turns together with the bit, is formed from a plurality of helical windings of spring stock, with radially protruding fins 88 as does the external tube 82 in FIG. 9. The fins tend to carry any chips produced by the bit 70 backwardly along the curved hole and exert an advancing force by their auger effect, improving the efficiency of cutting.

The external spring 82 is used to drive bit 70 in this embodiment. However, it is less complex to use an internal spring 74 to do the driving. In order to be effective at pulling chips back from the bit using spring 82 in FIG. 10, it is necessary to wrap the external spring in a direction whereby turning the bit would loosen the external spring. It is possible to employ an interengaging structure for the external spring wraps as shown n FIG. 9, in order to effectively drive the bit. The helical wraps of the external spring can engage over one another such that a maximum extent of unwinding is defined. The external finned spring 82 can be dimensioned to nearly the size of bore 22, which also discourages unwinding.

An alternative configuration is illustrated in FIG. 10, wherein the bit 70 is driven by an external spring 82. In this arrangement, the rigid curving element between the driving means and the bit is a rigid bent shaft 84 i.e., a solid shaft, rather than a curving tube. A flexible tubular element 82, which can be a spring, resides externally on the shaft. According to this arrangement, the motor or drill can be arranged such that its axis is directed initially at the workpiece, leaving the user more room to manipulate the tool. A 90 degree change in drive direction occurs between two engaged conical gears 86. The rigid bent shaft 84, which actually is straight in the area of the conical gears 86, extends through the center of one of the gears which rotates on the fixed shaft 84, providing a mounting means for the overall arrangement. In this embodiment, as in the previous embodiment, the angle defined from the bit to the base or chassis is greater than 90 degrees, for example 100–105 degrees, the 90 degree point being located at or behind the rear edge of the bit.

The invention as disclosed herein is an apparatus for forming in a workpiece 20 a curved hole 22 following a circular path, the apparatus comprising a support 30 shaped to rest against the workpiece 20. A chassis 50 is mounted to the support 30 on a pivot axis 38, the pivot axis 38 corresponding to a center of the path. A drilling bit 70 is mounted on a distal end of a shaft 74 and a power transmission section 76 is connected to the drilling bit 70 and disposed along an arc coaxial with the pivot axis. Means are provided for applying power to the power transmission section 76 while forcing the chassis 50 around the pivot axis 38.

The support 30 includes an angle bracket 32 defining a right angle receptacle or flanged part for resting against a right angle corner of the workpiece 20. The support 30 may define a channel 46. Support 30 further comprises a movable clamp element 52 movably attached to the angle bracket 32 and means urging the movable clamp element toward the flanged part, e.g., angle bracket, whereby the support 30 is adjustable to span and possibly clamp onto the workpiece 20.

The apparatus may include a handle 40 rigidly attached relative to chassis 50, the handle including a portion spaced from the pivot axis 38 for forcing the chassis 50 around the pivot axis 38.

The power transmission section 76 includes a flexible drive shaft 74 disposed in tube 72 in which spring 80 is disposed. Or, transmission section 76 may include a flexible drive which includes a flexible power-transmitting tube 82 mounted on a rigid shaft 84. Flexible tube 82 may be a spring.

The means for applying power to the power transmission section 76 includes a motor 96 rigidly fixable relative to the chassis 50 and a connector 62 for attaching a shaft 64 of the motor 96 to the power transmission section.

The drilling bit 70 may be rotatable at a fixed bushing 54 disposed at a distal end of the power transmission section 76. The drilling bit 70 may be wider than the power transmission section along a line transverse to the path 22.

Chassis 50 preferably includes fixed bushing 54 receiving the power transmission section 76 and a connector attached to the power transmission.

The pivot axis 38 may be displaced outwardly from a surface of the workpiece 20.

The power transmission section 76 may include a gear train 86 defining a right angle.

The power transmission section 76 may include a spring 82 disposed externally on a rod 84 bent coextensively with the path 22.

Between chassis 50 and a free end of the drilling bit 70, the apparatus intersects an angle around the axis 38 of about 100 to 105 degrees, whereby the bit 70 emerges completely from the workpiece at the end of a boring procedure.

The invention having been disclosed, a number of additional variations and embodiments will occur to persons skilled in the art having knowledge of this disclosure. Reference should be made to the appended claims rather than the foregoing specification as indicating the true scope of the invention.

I claim:

1. An apparatus for forming in a workpiece a curved hole following a circular path, the apparatus comprising:

a support shaped to at least partly engage said workpiece for fixing the support relative to the workpiece;

a chassis pivotally mounted to the support on a means defining pivot axis, the pivot axis corresponding to a center of said circular path;

a drilling bit mounted on a distal end of a shaft fixed to the chassis and a power transmission section connected to the drilling bit and disposed along an arc coaxial with the pivot axis, the power transmission section including a flexible drive, said drive including a flexible powertransmitting tube mounted on a shaft; and, means for applying power to the power transmission section while forcing the chassis around the pivot axis, the drilling bit being guided through the workpiece with pivoting of the chassis relative to the workpiece and the support.

2. The apparatus of claim 1, wherein the support includes an angle bracket defining a right angle receptacle for resting against a right angle corner of the workpiece.

3. The apparatus of claim 1, wherein the support defines a channel.

4. The apparatus of claim 1, wherein the support comprises an angle bracket opposed by a movable clamp element movably attached to the angle bracket, and means urging the movable clamp element toward the angle bracket whereby the support is adjustable to span the workpiece.

5. The apparatus of claim 4, wherein the movable clamp element includes two L-shaped parts attached to the angle bracket on opposite sides along the pivot axis, one of the angle bracket and said L-shaped parts having a slot for receiving a guide attached to the other of the angle bracket and said L-shaped parts, for adjustably engaging the workpiece between the angle bracket and the L-shaped parts.

6. The apparatus of claim 1, further comprising a handle member rigidly attached relative to the chassis, the handle member including a portion spaced from the pivot axis, for manually exerting a force on the chassis, around the pivot axis.

7. The apparatus of claim 8, wherein the flexible tube is a spring.

8. The apparatus of claim 1, wherein said means for applying power to the power transmission section includes a motor rigidly fixable relative to the chassis and a connector for attaching a shaft of the motor to the power transmission section.

9. The apparatus of claim 8, wherein said motor is contained in an electric hand drill and the connector a chuck of said electric hand drill attachable to the power transmission section.

10. The apparatus of claim 1, wherein the drilling bit is rotatable at a fixed bushing disposed at a distal end of the power transmission section.

11. The apparatus of claim 10, wherein the drilling bit is wider than the power transmission section along a line transverse to said path.

12. The apparatus of claim 1, wherein the chassis includes a fixed bushing receiving the power transmission section and a connector attached to the power transmission section.

13. The apparatus of claim 1, wherein the pivot axis is displaced outwardly from a surface of the workpiece.

14. The apparatus of claim 1, wherein from the chassis to a free end of the drilling bit, the apparatus intersects an angle around the axis of about 100 to 105 degrees.

15. An apparatus for forming in a workpiece a curved hole following a circular path, the apparatus comprising:
- a support shaped to at least partly engage said workpiece for fixing the support relative to the workpiece;
- a chassis pivotally mounted to the support on a means defining pivot axis, the pivot axis corresponding to a center of said circular path;
- a drilling bit mounted on a distal end of a shaft fixed to the chassis and a power transmission section connected to the drilling bit and disposed along an arc coaxial with the pivot axis, the power transmission section including a gear train defining a right angle and a spring disposed externally on a rod bent coextensively with the path; and,
- means for applying power to the power transmission section while forcing the chassis around the pivot axis, the drilling bit being guided through the workpiece with pivoting of the chassis relative to the workpiece and the support.

16. An apparatus for forming in a workpiece a curved hole following a circular path, the apparatus comprising:
- a support shaped to at least partly engage said workpiece for fixing the support relative to the workpiece;
- a chassis pivotally mounted to the support on a means defining pivot axis, the pivot axis corresponding to a center of said circular path;
- a drilling bit mounted on a distal end of a shaft fixed to the chassis and a power transmission section connected to the drilling bit and disposed along an arc coaxial with the pivot axis, a spring disposed externally on the shaft, the spring having helical windings with radially protruding surfaces and being rotatable on the shaft such that chips are carried backwardly from the drilling bit; and,
- means for applying power to the power transmission section while forcing the chassis around the pivot axis, the drilling bit being guided through the workpiece with pivoting of the chassis relative to the workpiece and the support.

17. The apparatus of claim 16, wherein the spring is fixed relative to the drilling bit at a distal end of the shaft.

* * * * *